May 5, 1931.  C. F. WARRICK  1,803,446
ELECTRIC MIXER
Filed Dec. 10, 1928
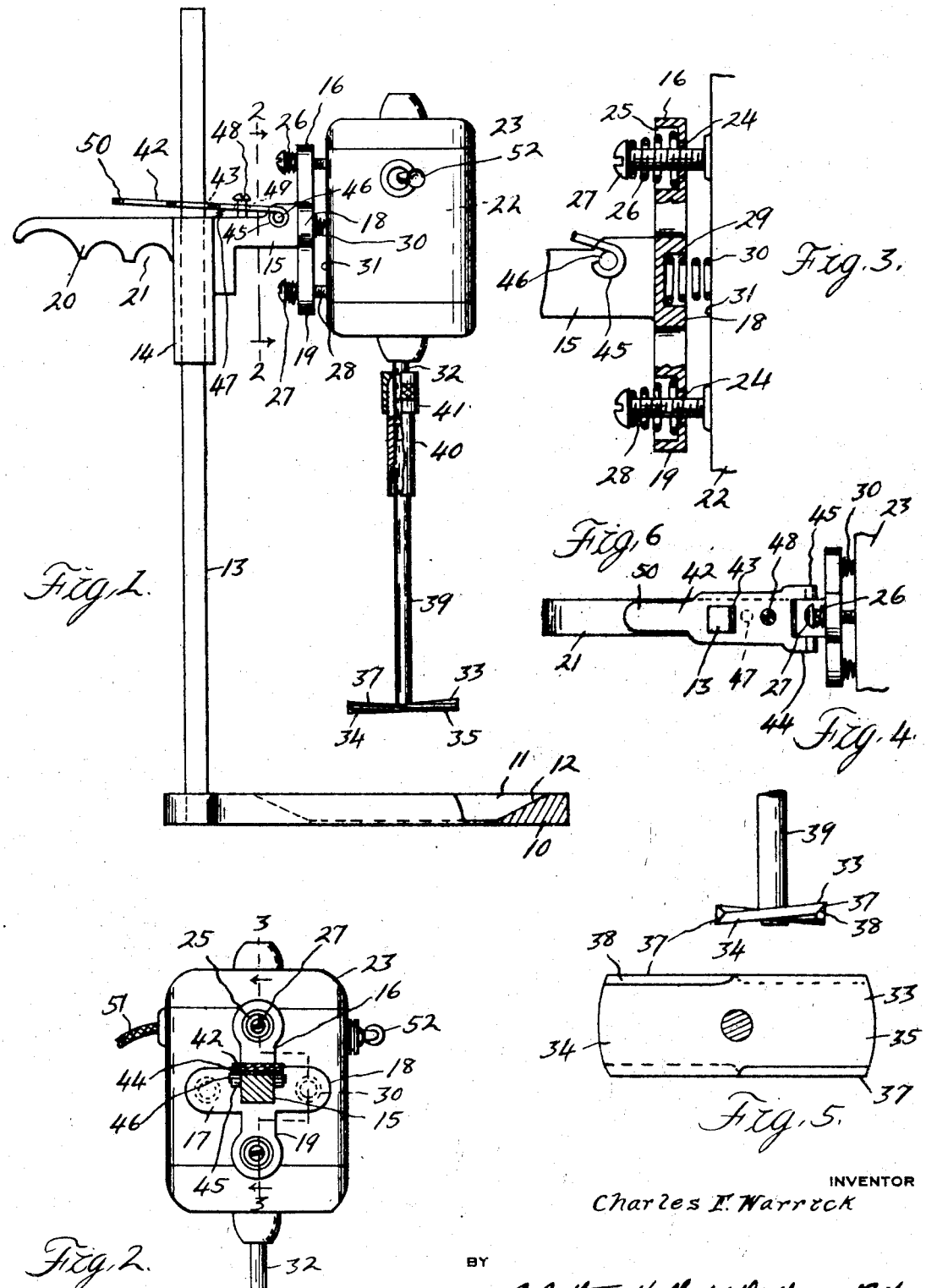
INVENTOR
Charles F. Warrick
BY
Whitemore Hulbert & Whitemore Belknap
ATTORNEYS Patented May 5, 1931

1,803,446

UNITED STATES PATENT OFFICE

CHARLES F. WARRICK, OF DETROIT, MICHIGAN

ELECTRIC MIXER

Application filed December 10, 1928. Serial No. 324,999.

The invention relates to mixing apparatus and more particularly to an electric device adapted for domestic use.

The object of the invention is to provide an electric mixer capable of eliminating the manual operations in connection with the preparation of foods and drinks where mixing, beating or stirring is necessary. To this end I have provided the device hereinafter more fully described having many novel features of construction, among which are the following:

First, the device is provided with an electric motor powerful enough to do the mixing or stirring of heavy batters for cakes, muffins, waffles etc.

Second, the motor is mounted in a novel manner capable of absorbing the vibration. The mounting is also designed to prevent bending of the motor shaft in case of accidental lateral pressure on the impeller.

A third advantage is due to the particular construction employed for adjustably mounting the motor on the vertical column.

A fourth advantage lies in the construction of the impeller which is pitched like the blades of a ship's propeller, thus forming a vortex and causing a circulation of the material to be mixed downward through the impeller and upward along the sides of the container. This insures a complete and uniform mixture.

Further advantages will be more apparent from the detailed description hereinafter given and from inspection of the accompanying drawings, wherein Figure 1 is an elevation of the apparatus;
Figure 2 is a section taken on the line 2—2 of Figure 1;
Figure 3 is a section taken on the line 3—3 of Figure 2;
Figure 4 is an end view of the impeller;
Figure 5 is a plan view of the impeller;
Figure 6 is a top plan view of Figure 1.

Referring now to the construction as illustrated in the drawings, the device comprises a base 10 having an aperture 11 in the same formed by the beveled side walls 12 and serving for the mounting of a dish or other receptacle. 13 is a vertical rod extending upwardly from the base 10 on which is slidably mounted a supporting member 14. The rod 13, as shown, is square in cross section and engages an opening of similar dimensions in the supporting member 14. This member has a laterally extending portion 15 extending over the base 10 and terminating in the arms 16, 17, 18 and 19, all arranged in a common vertical plane. The bracket also has the oppositely extending gripping portion 20 scalloped on the under side thereof, forming three curved finger grips 21. 22 is an electric motor having a motor casing 23 which, as shown, is of rectangular shape. The motor is mounted on the supporting member 14 in such a manner as to provide a resilient yieldable connection capable of absorbing vibration due to the rotation of the motor and capable also of permitting lateral deflection of the entire motor under stresses acting transversely to the axis of the motor.

While various constructions may be employed for mounting the motor on the supporting member, the preferred construction is as follows:

The upper and lower arms 16 and 19, respectively, have apertures 24 therethrough and enlarged recesses 25 in the face adjacent the column 13. A coil spring 26 engages each recess 25 and projects outwardly beyond the arm where it engages the head 27 of a machine screw 28. The screw extends through aperture 24 and threadedly engages the motor casing 23. In the preferred construction the spring 26 is conical in shape, the large end being of a size to fill the recess 25 and the small end being of a size to engage the shank of the machine screw 28. The side arms 17 and 18 are each provided with recesses 29 in the faces adjacent the motor casing in which are arranged similar conical springs 30, the small ends of which are adapted to bear directly against the inner face 31 of the motor casing. The springs 30 thus serve to maintain the motor casing in spaced relation to the arms 17 and 18 but do not support the weight of the motor. With the construction as described, the motor is supported by the machine screws 28 in such a manner that a universal movement of the same with respect to the supporting member can be obtained.

32 is the shaft of the motor which extends vertically and projects downwardly below the motor casing 23. Secured to the shaft 32 is an impeller 33 which consists of two blades 34 and 35, each of which is inclined with respect to the horizontal plane. This arrangement provides for a vertical circulation of the material which is being mixed. The blades, as shown, also have the sharp edges 37 formed by the inclined sides 38. For securing the impeller to the motor shaft there is provided an impeller shaft 39 having at its upper end a chuck 40 frictionally secured to the shaft 32 by the clamping collar 41, and prevented from rotation on the shaft by key.

My improved mixer is provided with means for conveniently adjusting the height of the impeller and for raising or lowering the motor with respect to the receptacle in which the mixing takes place. The preferred construction includes a friction clamp which, as shown, comprises a clamping plate 42 having a rectangular aperture 43 therein of slightly larger width than the rod 13. The plate has a bifurcated end, the furcations 44 of which are return bent, forming hinges 45 and engaging the axially aligned pins 46 on the supporting member 14. A spring 47 interposed between the plate 42 and supporting member 14 serves to maintain said plate in frictional contact with the rod 13, thus holding the entire mechanism in any desired vertical position. A set screw 48 extends through an aperture 49 in the plate and is secured to the supporting member 14, the head of the set screw forming a stop for limiting the upward movement of the plate when the supporting member is removed from the rod 13. The outer end 50 of the locking plate is arranged above the gripping portion 20 so that it is in a convenient position to be actuated by the thumb when three fingers of the hand are engaged in the finger grips 21. The construction as described is convenient for quick raising and lowering of the motor.

The electric motor is connected to the electric supply by means of a flexible cord 51 and is preferably controlled by a switch 52 on the outside of the motor casing.

The construction as above described is adapted not only for the mixing of drinks for which very little power is required, but is also adapted for relatively heavy work such as the mixing of batters where considerably more power is necessary. The apparatus constructed in the manner described above is particularly adapted for use as a domestic implement and is designed for convenient use with mixing bowls and other utensils in common use. The base 10 is preferably provided with a rubber mat apertured to correspond with the base and interposed between the base and the mixing bowl.

While I have indicated one embodiment of the invention, it is to be understood that other modifications may be developed coming within the purview of the invention, and the specification and drawings are therefore considered only as illustrative of the invention.

What I claim as my invention is:

1. A mixing device comprising a standard, a laterally projecting supporting member, a motor having a vertical axis, a plurality of supporting arms on said supporting member arranged to one side of the axis of said motor, and spring connections between the casing of said motor and said supporting arms.

2. A mixing device comprising a standard, a laterally projecting support, a motor having a casing, a series of arms projecting laterally of said support and arranged to one side of the axis of said motor and a laterally projecting spring between each of said arms and said casing.

3. A mixing device comprising a base, a column extending upwardly therefrom, a supporting member projecting laterally of said column, a series of arms arranged in a vertical plane, a rectangular motor casing and a series of spring supporting members between said arms and said motor casing.

4. In a mixing device, the combination of a motor casing having a substantially vertical axis, a series of arms adjacent said motor casing, supporting studs projecting from said motor casing through one or more of said supports, a spring between said stud and one of said arms and springs between others of said arms and said motor casing.

5. In a mixing device, the combination with a standard having a series of arms, a motor casing, a pair of headed studs extending through two of said arms and secured to said motor casing, coil springs between said arms and said heads and other coil springs between the other arms and said motor casing.

6. In a mixing device, the combination with a spider member having a series of arms arranged in substantially the same plane, two of said arms having recesses on one side of said plane and two others of said arms having recesses on the opposite side of said plane, a motor casing, springs engaging the first mentioned recesses, studs engaging said springs and passing through said arms and being secured to said motor casing and springs engaging the other recesses aforesaid and directly engaging said motor casing.

7. A mixing device comprising a standard, a column extending upwardly therefrom, a supporting member slidable on said column, an electric motor carried by said supporting member and a plate hingedly connected to said supporting member and apertured to receive said column and springs between said plate and said supporting member for frictionally holding the former to said column.

8. In a mixing device, a motor casing having a substantially vertical axis, a supporting member adjacent said motor casing, means for supporting said motor casing from said supporting member, and means between said motor casing and said supporting member for urging said motor casing away from said supporting member.

9. In a mixing device, a motor casing having a substantially vertical axis, a series of arms adjacent said motor casing and arranged to one side of the axis thereof, connections between certain of said arms and said motor casing for supporting said motor casing from said supporting member, springs associated with said connections for urging said motor casing toward said supporting arms, and additional springs between other of said arms and said motor casing for urging said motor casing away from said supporting arms.

In testimony whereof I affix my signature.

CHARLES F. WARRICK.